UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, A CORPORATION OF NEW JERSEY.

DEPOLARIZING AGENT.

1,236,693.     Specification of Letters Patent.     Patented Aug. 14, 1917.

No Drawing.     Application filed October 25, 1915. Serial No. 57,680.

*To all whom it may concern:*

Be it known that I, CARLETON ELLIS, a citizen of the United States, and a resident of Montclair, in the county of Essex and State of New Jersey, have invented certain new and useful Improvements in Depolarizing Agents, of which the following is a specification.

This invention relates to depolarizing agents adapted for dry batteries of the Leclanché type especially the form known as the miniature dry battery used in pocket flash lights and the invention has to do particularly with complex manganese compounds preferably compounds resulting from fusion operations particularly complexes of manganites and manganates, and specifically is concerned with crystalline higher oxid complexes.

Manganese dioxid especially in the hydrated form is regarded as an acid body which under some conditions takes on a basic character or at least combines into a complex in which it presumably exerts the influence of a base and this is particularly the case with manganic acid with which it forms a complex along with the other elements. An example of such compound is barium manganite manganate having the formula

Barium manganite manganate may be prepared by fusing together a mixture of barium hydroxid, potassium nitrate and potassium permanganate. The materials should be thoroughly mixed together and heated to a temperature of about 280° C. The mix may be made from 1 molecular proportion of potassium permanganate, 4 molecular proportions of barium hydroxid and 5 molecular proportions of potassium nitrate. By careful heating these ingredients afford a more or less granular and crystalline material. This compound is basic as shown by the formula above.

The barium may be replaced in this formula by manganous oxid and a depolarizing agent obtained which may be used alone or in admixture with the barium compound.

In a similar manner a series of derivatives of this complex with other elements may be prepared and owing to the peculiar complex structure unstability oftentimes enables the oxygen of this material to be given up with great ease, thereby affording rapid depolarizing action without however involving the presence of acid bodies which might cause local action causing the battery to run down when standing.

Substantially crystalline or semi-crystalline products may be obtained which mix to advantage with mineral manganese and graphite to form a good depolarizing agent. A mixture of about equal parts of the manganese complex with mineral manganese or equivalent material and combined with an equal weight of graphite furnishes an effective formula.

The depolarizing composition may be compressed into blocks or molded about a carbon electrode which may be immersed in an ammonium chlorid exciting liquid or paste carried in a zinc container.

The foregoing specific illustration of a depolarizing complex is not of the nature of a polymanganite but is built up of manganese dioxid and manganic acid or other higher oxygenated compound of manganese. Various other manganates may be used especially those derived by fusion processes yielding a crystalline-like or pseudo-crystalline depolarizing agent which is dense like natural manganese dioxid of the pyrolusite type but unlike pyrolusite, is very active as a depolarizer. The use of a fused depolarizer is a feature of this invention and in so far as the application of fused depolarizing material is concerned the invention embraces any form of manganese having depolarizing qualities and capable of being fused to the required density. The fused product is ground to a powder and incorporated with graphite, etc., to form a depolarizing mix.

A further modification of the invention consists in incorporating an artificial amorphous manganese dioxid or a simple manganous manganite with fused sodium nitrate and allowing the particles of manganese material to densify in the molten vehicle. This may be heated far above the point at which the dioxid loses its oxygen and a sort of crystallization or densification thus occurs. Manganite-manganates are obtained by digestion for a considerable period at a temperature about 100–200° above the melting point of the nitrate.

The composition indicated in the foregoing formula may be suitably digested under these conditions to produce the product desired.

What I claim is:—

1. As a depolarizing agent a manganite manganate.

2. As a depolarizing agent a complex containing manganese dioxid and manganic acid.

3. As a depolarizing agent a complex of a crystalline character containing manganese dioxid and manganic acid.

4. As a depolarizing agent a complex containing manganese dioxid and manganic acid admixed with carbon.

5. As a depolarizing agent a fused artificial higher oxid of manganese, substantially free from natural manganese dioxid and containing manganic acid.

CARLETON ELLIS.